July 12, 1932.  H. L. TANNER  1,866,733
GYROSCOPIC COMPASS
Filed Nov. 19, 1918  2 Sheets-Sheet 1
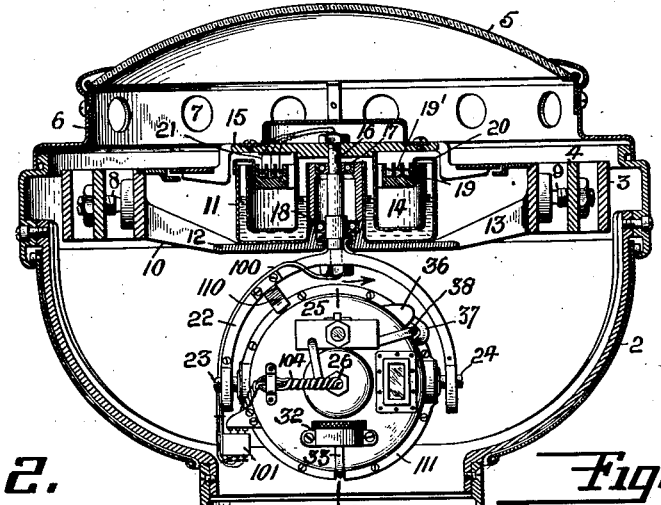
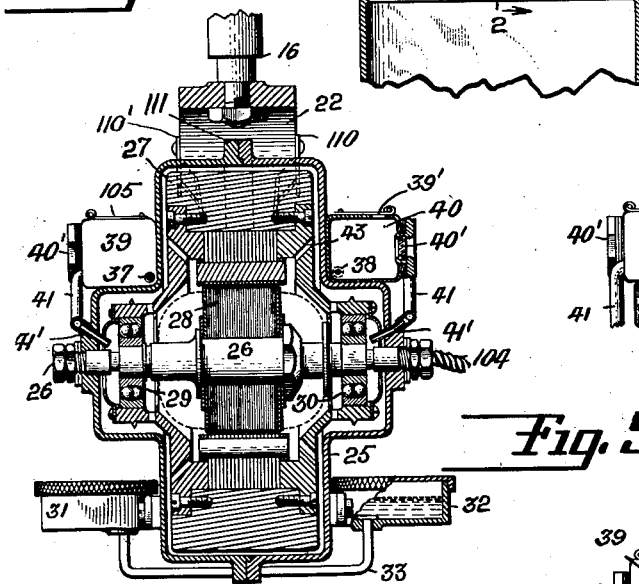
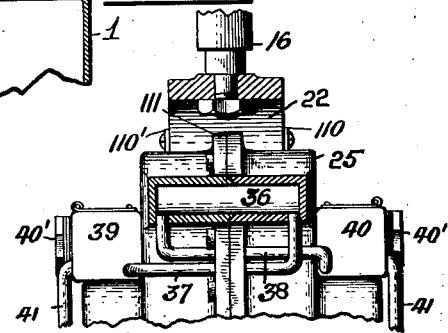
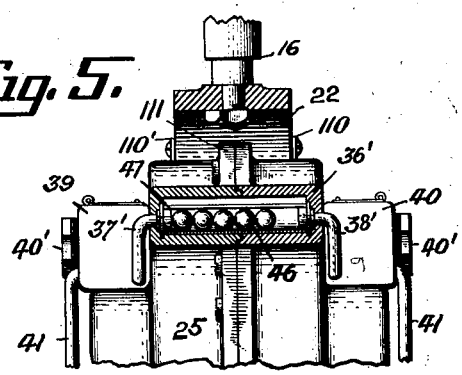
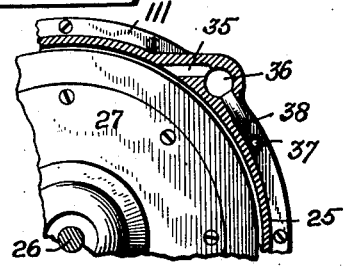
INVENTOR
HARRY L. TANNER
BY Herbert H. Thompson
his ATTORNEY July 12, 1932.  H. L. TANNER  1,866,733
GYROSCOPIC COMPASS
Filed Nov. 19, 1918  2 Sheets-Sheet 2
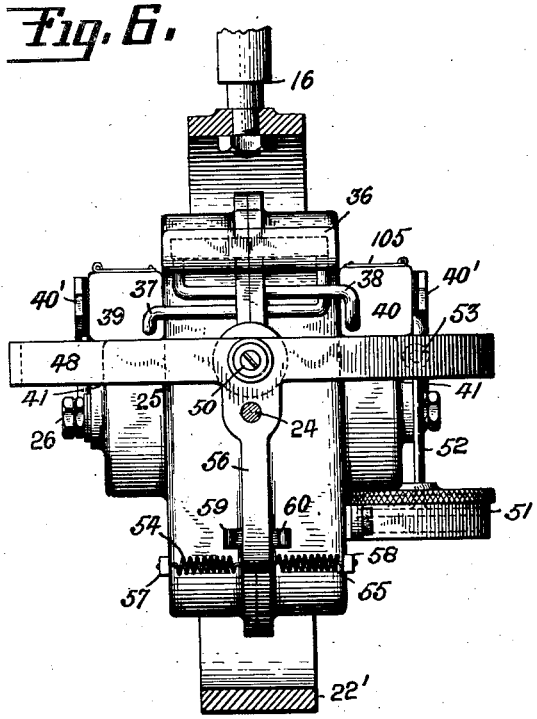
Fig. 6.
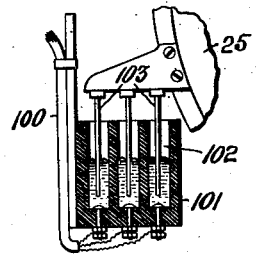
Fig. 1ᵃ.
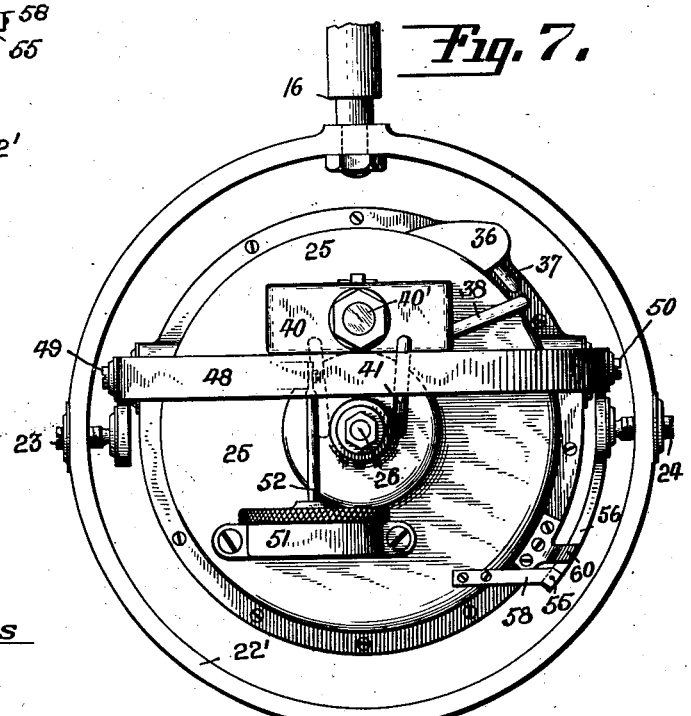
Fig. 7.
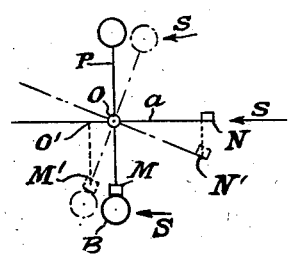
Fig. 8.
INVENTOR
HARRY L. TANNER
BY Herbert H. Thompson
his ATTORNEY Patented July 12, 1932

1,866,733

UNITED STATES PATENT OFFICE

HARRY L. TANNER, OF BROOKLYN, NEW YORK, ASSIGNOR TO THE SPERRY GYROSCOPE COMPANY, INC., OF BROOKLYN, NEW YORK, A CORPORATION OF NEW YORK

GYROSCOPIC COMPASS

Application filed November 19, 1918. Serial No. 263,118.

This invention relates to gyroscopic navigational apparatus in which one or more gyroscopes are employed to indicate the meridian. More particularly the invention relates to gyroscopic compasses as distinguished from gyroscopic position indicators, the gyroscopic compass being an apparatus possessing a positive directive power so that it will automatically seek the meridian whenever displaced. Heretofore, insofar as I am aware, gyroscopic compasses have always been constructed so as to be under the influence of gravity at all times. In other words, the modern gyroscopic compass is decidedly pendulous about the horizontal axis of oscillation, having a pendulous factor of several pounds. It has also been proposed to construct gyroscopic compasses, which, instead of being pendulous, are top heavy about said horizontal axis. In either event, however, the effect of gravity upon the gyroscope gives rise to deflection of the compass when the ship upon which the apparatus is mounted is rolling or pitching, or both, on an intercardinal course. As such rolling and pitching produces a torque about the vertical axis of the gyroscope causing deflection, various means have been tried up to the present time for reducing the deflection so produced. By this invention, however, I have succeeded in substantially eliminating the cause of said deflection. For this purpose, instead of making the compass pendulous about the horizontal axis, I balance it, and impart to the compass a directive power by a means which is only brought into action when the compass departs from the meridian and which is only slightly, if at all, affected by the rolling and pitching of the ship.

Referring to the drawings in which what I consider the preferred forms of the invention are shown:

Fig. 1 is a front elevation partly in section of a gyroscopic compass as mounted within the supporting gimbals and bowl.

Fig. 1—A is a detail of a mercury cup used to introduce current into the gyroscope.

Fig. 2 is a vertical section of the gyroscope employed in said compass, this section being approximately taken on line 2—2 of Fig. 1.

Fig. 3 is a detail of the compass partly in section showing the damping system.

Fig. 4 is another detail showing a section of a portion of the gyroscope casing, in which is mounted the damping reservoir.

Fig. 5 is a view corresponding to Fig. 3 showing a modified form of damping means.

Fig. 6 is a side elevation partly in section of a modified construction of the gyroscope in which the relative positions of the center of gravity and axis of oscillation are shifted by different means.

Fig. 7 is a front elevation of the same.

Fig. 8 is a diagram illustrating certain advantages of my invention.

The gyroscope is shown in Fig. 1 as mounted upon a base 1 to which is secured a bowl 2 which supports the gimbal rings 3 and 4 of the compass. The bowl is shown covered by a curved glass top 5 secured in a metal ring 6 in which ventilating holes 7 are provided. The inner ring 4 supports on horizontal pivots 8 and 9 a frame work 10. Said frame supports the gyroscope proper for rotation about the vertical axis by any suitable means. For this purpose I have shown an annular bowl 11 supported on a plate 12 held by bracket arms 13. Said bowl is designed to contain mercury or other suitable liquid with which to support the annular hollow float member 14. Said float is secured at its center to the plate 15 which supports the vertical stem 16 of the compass. Said stem may be journalled in radially disposed anti-friction bearings 17 and 18 supported from plate 12. Current may be introduced into the gyroscope for driving the rotor by means of a plurality of annular mercury cups 19 and 19' secured to the basin 11 by an annular bracket 20 which preferably also serves to cover the surface of the mercury. A plurality of brushes or contact points 21 secured to the plate 15 dip in the annular mercury cups and thus serve to introduce current into the gyroscope, the current being carried preferably from the brushes down the central stem 16 thence through cable 100 to junction box 101. Said box is provided with a plurality of mercury troughs 102 into which contacts 103 secured to casing 25 dip (see Fig. 1—A). From the contacts, a cable 104 leads into the casing through the shaft 26. Stops 110 and 110′ may be secured to ring 22 to prevent the gyroscope from overturning, when idle. Said stops abut against the flange 111 on the casing.

It is obvious that this invention is independent of this specific means for supporting the compass for movement about the vertical axis or in fact of any of the details so far described, the above described means being merely one method of accomplishing the general purpose. To the central stem is secured a member 22 which supports by horizontal pivots 23 and 24 the casing 25 of the gyroscopic rotor. The gyroscope and casing are preferably very nearly balanced about said horizontal axis but may be slightly pendulous for a purpose hereinafter described. Journalled within the casing on a horizontal shaft 26 is the gyroscopic rotor or wheel 27. Said rotor is preferably formed as a rotor of an induction motor the stator 28 of which is supported on said shaft 26 and is partially or completely enclosed by the said rotor. As shown, the rotor is journalled on ball bearings 29 and 30 adjacent each end of said shaft, the stator being situated between the bearings.

As is well known, a perfectly balanced gyroscope, provided no further physical properties are added, will possess little or no directive power and cannot, therefore, be used as a compass. In order to give the gyroscope directive power, I provide means for applying a torque about the horizontal axis of oscillation of the gyroscope preferably by shifting the relative position of said axis and its center of gravity, said means being responsive to inclination of the gyroscope. One method of accomplishing this purpose is shown in Figs. 1 and 2. Secured to or made a part of the casing are a plurality of liquid containers 31 and 32. Said containers are preferably located on opposite sides of the casing 25 and on opposite sides of the axis 23 and 24 of oscillation. Said casings are also connected by a transversely extending tube 33 of restricted interior diameter. Any comparatively heavy liquid may be used in the containers but preferably mercury is employed. The action of the liquid is as follows:

Normally, when the compass is on the meridian it is substantially level and there is an equal amount of liquid in each container so that the compass is substantially balanced about the horizontal axis. In such condition acceleration pressures can have no effect. In case the compass should become displaced from the meridian, however, one side will slowly rise which will result in the liquid from the container on the high side of the casing slowly flowing into the reservoir on the low side of the casing. This, it will be seen, will at once result in an unbalanced condition which will exert a torque about the horizontal axis tending to cause the gyroscope to incline further about the horizontal axis. The gyroscope will hence behave somewhat in the manner of a top heavy gyroscopic compass and should rotate in the opposite direction to the rotation of the earth. During rolling and pitching, however, the interchange of liquids will not be brought into operation since the period of roll or pitch is very much shorter than the period of oscillation of the compass about the meridian, the rolling or pitching being a matter of a few seconds only, while the oscillation about the meridian requires over an hour. By making the passage 33 between the receptacles of sufficiently restricted size with respect to the size or cross section of the containers or receptacles a relatively insignificant amount of liquid will flow from one container to the other during the rolling and pitching and hence there will be substantially no pendulous factor of the gyroscope upon which the acceleration pressures due to the rolling and pitching of the ship may operate. Viewing the matter from a different angle, the cross sectional area of the containers is made much greater than that of the connecting pipe to give the liquid a different and preferably much longer period of oscillation than the period of roll or pitch of the ship. The cross sectional area of the containers also has a very material bearing on the period of the compass in oscillating about the meridian and the correct behavior of the compass when the ship is accelerating or turning. It can easily be demonstrated that the torque exerted by gravity on my compass in which the liquid flows freely under the action of gravity on inclination thereof, is proportional, generally speaking, to the cross sectional area of the containers, the horizontal distance of the centers thereof from the pivotal supporting axis 23—24, and the specific gravity of the liquid employed, being independent to a certain extent of the total mass of mercury employed. I find it highly desirable, therefore, to concentrate the principal portion of the mercury in containers of substantial cross section at some distance on each side of the center line of the compass and to connect the same by a tube of small bore. In view of the fact, however, that a small amount of liquid may flow from one casing to the other during the rolling and pitching I may make the gyroscope slightly pendulous as aforesaid to counteract the effect of the said interchange of liquid.

Another important advantage of my type of compass over the pendulous compass may here be emphasized. To clearly bring out the difference, reference is had to Fig. 8, in which a compound "pendulum" P, if it may be termed such, is shown pivoted and perfectly balanced about O. A cross arm $a$ is rigidly secured to the pendulum. Now if a mass M be placed on the lower bob B, the device will be made pendulous, as in the case of the ordinary compass. If, however, a mass N be placed on cross arm $a$, the device while having pendulous properties, will not be affected by acceleration forces at right angles to the pendulum, indicated by arrows S, as long as the pendulum remains vertical. Even after becoming slightly inclined, the effect of the said forces is very much less than on the mass M, on account of the great difference in the lever arms in the two cases, the lever arm in the case of mass M being approximately $\overline{M'O'}$ while in the case of mass N it is only $\overline{NN'}$. As a gyro compass practically never becomes inclined more than one or two degrees, it will be seen, even when the most of the mercury that would flow, due to such inclination, is to one side of the center, that acceleration forces will have little effect thereon. It should further be understood that a certain effect from acceleration pressures due to the acceleration or turning of the ship is very desirable. This is brought about by the interchange of the mercury in the tanks 31 and 32 whenever an acceleration force acts upon the compass for a length of time greater than the average period of roll and pitch. This change is entirely independent of the inclination of the compass and is due to the tendency of liquids to flow in the direction of an applied force. The result is that a torque will be exerted on the gyroscope by the displaced mercury which is proportional to the applied force, and as above stated, in general to the cross section of the containers, specific gravity, and lever arm. By correctly proportioning these last named factors, the compass will be brought to its new settling point by the time the ship has settled upon its new course or rate of speed, or in other words, proper ballistic deflection is obtained.

A preferred method of damping a compass constructed according to my invention, which method also has application to other forms of compasses, is illustrated in Figs. 3 and 4. Within the casing 25 and adjacent the periphery of the rotor I provide a passageway 35 leading to a closed receptacle 36 which is preferably centrally situated. From each end of said receptacle lead pipes 37 and 38, which are respectively connected with receptacles 39 and 40 mounted on either side of the casing. Each receptacle is connected by a small pipe 41 having a restricted passage 41' therein to the interior of the bearings of the gyroscope. Each receptacle 39 and 40 may be provided with a window 40' in order that the operator may observe whether the oil is circulating properly or not. A hole 39' normally covered by a cover plate 105 may also be provided in each receptacle so that a fresh supply of lubricant may be added to the system. The action of the damping means is as follows: The system is partially filled with oil. As the rotor revolves the oil will be thrown out along the rotor to the periphery thereof and from there carried over to the surrounding casing. The rotor is also shown as provided with holes 43 to permit oil on the interior thereof to escape to the exterior. A film of oil will hence circulate around the interior of the casing while the passageway 35 will serve to lead off a portion of said circulating oil into the reservoir 36. As long as the casing is horizontal the oil from the reservoir 36 will flow with equal velocity through the pipes 37 and 38 into the receptacles 39 and 40 whence it will flow back into the bearings. In case the gyroscope should begin to rise, however, it will be seen that, owing to the fact that the pipes 37 and 38 cross to opposite sides of the casing, the oil will flow to the high side of the casing. This, of course, is opposite to the action of the mercury in the containers 31 and 32 but of very much less effect, due to the relative lightness of the oil and also, if desired, to its slower movement. Furthermore, the damping system is so designed that the rate of flow of oil is substantially different from the rate of the flow of mercury so that the two speedily become out of phase whereby a maximum damping effort is secured. This effect is also produced by the difference in the design of the two systems. From the construction of tanks 31 and 32 and tube 33, it will at once be apparent that for slow oscillations about the meridian the mercury will change its direction of flow almost as soon as the gyroscope changes its direction of oscillation about its horizontal pivots. But in the case of receptacle 36 and reservoirs 39 and 40, oil will continue to flow at a greater rate from receptacle 36 into the higher reservoir after the gyroscope starts to descend and until it passes its mid-position.

In Fig. 5 a modified method of causing the oil to flow to the high side of the casing is illustrated. In this figure instead of crossing the pipes 37 and 38 to the opposite side of the casing two pipes 37' and 38' run into the containers 39 and 40 adjacent the ends of the receptacle 36' from which the respective pipes lead. Within said container is placed a plurality of balls 46 which are free to roll from one side of the reservoir to the other. The balls are so arranged that when they roll to the low side of the casing they will close the opening 47 leading to the adjacent pipe 37', for instance, as illustrated in Fig. 5, so that the greater part of the oil circulating through the system will go into the receptacle 40 while the balls roll in the opposite direction and a similar action takes place when the gyroscope is oppositely inclined.

It will readily be seen that substantially the same result is obtained by this method as by the means of Figs. 3 and 4.

It is, of course, obvious that other means may be employed within the scope of my invention for causing a torque to be applied about the horizontal axis of the gyroscope upon inclination thereof. One such means is illustrated in Figs. 6 and 7. This modification is not claimed specifically herein, however, since the subject matter thereof is embodied in my divisional Patent No. 1,725,317 dated August 20, 1929, for anti-pendulous compasses. In these figures within ring 22' upon pivots 23 and 24 is supported a second ring 48 which in turn supports the gyro-casing 25 upon pivots 49 and 50. Said last named pivots are preferably normally directly above the pivots 23 and 24 respectively. The ring 48 and the gyro casing are connected by a slowly yielding means such as a dash pot 51 shown as secured to the gyro-casing and the dash pot piston 52 shown as linked at 53 to the ring 48. Preferably the ring and gyro-casing are also connected by centralizing springs 54 and 55 extending between an arm 56 and depending from said ring and brackets 57 and 58 secured to the gyro-casing. Preferably also fixed stops 59 and 60 secured to said casing are provided against which the extension 56 is adapted to strike upon the inclination of the gyro exceeding a predetermined amount. As shown, the same damping system may be provided for this form of gyroscope as illustrated in Fig. 3.

The action of this form of the apparatus is as follows: As long as the gyroscope is on the meridian and level the springs and dash pot will hold the pivots 49 and 50 directly above the pivots 23 and 24. The ring and casing will be in fact rigidly coupled by the dash pot for all disturbances of short period so that the casing will oscillate in effect about the axes 23 and 24, which are substantially in line with its center of gravity. On prolonged inclination of the gyroscope, however, the dash pot and piston will gradually yield allowing the ring 48 of the casing to fall in effect to the low side of the casing, thus displacing the center of gravity of the system. This it will be seen will have substantially the same effect as the flowing of the mercury in the modification first described. As the source of inclination is removed the centralizing springs 54 and 55 will slowly return the gyro to its position of equilibrium. The rolling and pitching of the ship will have substantially no effect on the gyroscope since as stated the dash pot is contructed to move very slowly and will act as a rigid connection for rapid oscillations of the gyroscope.

In accordance with the provision of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:—

1. In a gyroscopic compass, the combination with a gyroscope supported for turning about a vertical axis and for oscillation about a horizontal axis, said gyroscope being substantially balanced about the horizontal axis, of a fluid container on each side of the horizontal axis constrained to move with the gyroscope, and a tranverse connection between said containers and of less cross sectional area than the area of said containers, whereby the natural period of oscillation of the liquid is greater than the ordinary period of roll or pitch of a ship but said cross section area of said transverse connection being of sufficient size to permit substantially free flow of liquid during acceleration to cause ballistic deflection.

2. In a gyroscopic compass, the combination with a gyroscope, means for supporting the same for turning about a vertical axis and for oscillation about a horizontal axis, said gyroscope being substantially balanced about the last named axis, damping means therefor comprising a mass movably mounted with respect to said horizontal axis, and means for moving said mass upon inclination of the gyroscope against the action of gravity but out of phase with the oscillations of the gyroscope.

3. In a damping means for gyroscopic compasses the combination with a gyroscopic rotor, of a casing therefor, a receptacle in the casing adjacent the periphery of the rotor adapted to catch fluid thrown off therefrom, a pair of reservoirs for the fluid on opposite sides of said casing, and connections between said receptacle and each reservoir such that fluid will flow at a greater rate on inclination of the gyroscope into the reservoir on a predetermined side of the casing.

4. In a gyroscopic compass, the combination with a gyroscope, of means for damping the oscillations thereof comprising a fluid reservoir means for continuously supplying fluid thereto, a receptacle on each side of the gyroscope, connections between said reservoir and receptacles and gravity controlled valves therein such that fluid will flow at a greater rate into the higher receptacle than into the other on elevation of the gyroscope.

5. A means for damping a gyroscopic compass in which the gyroscope is rotated in the opposite direction to the earth, a reservoir, a fluid receptacle on each side of said gyroscope, means for supplying said reservoir with fluid, and means responsive to inclination of said gyroscope for causing fluid to flow into the receptacle on the high side of the gyroscope at a greater rate than into the receptacle on the lower side.

6. A damping means for gyroscopic apparatus, including a rotor, a casing for supporting the same for rotation about an axis and oscillation about a horizontal axis, a receptacle connected to the interior of said casing adjacent to the periphery of the rotor, the point of connection being such that fluid thrown off by the rotor will flow into said receptacle, an outlet from said receptacle on each side of the said horizontal axis and means responsive to tilt by the gyroscope for varying the relative rate of flow from said two outlets for causing a torque to be applied about said axis by preponderance of liquid on one side of the gyroscope.

7. A damping means for gyroscopic apparatus including a rotor, a casing for supporting the same for rotation about an axis and oscillation about a horizontal axis, a receptacle connected to the interior of said casing adjacent to the periphery of the rotor, the point of connection being such that fluid thrown off by the rotor will flow into said receptacle, an outlet from said receptacle on each side of the said horizontal axis and a receptacle on each side of the case connected to an outlet on the opposite side, said receptacle having a restricted connection leading back into said casing whereby variation in the rate of flow from said two outlets causes a torque on the high side of the gyroscope for damping purposes.

8. In a ship's gyroscopic compass adapted to rotate counter earthwise, the combination with a gyroscope casing, of means for permitting the free transfer of liquid from one side of an axis of said casing to another to impart meridian seeking properties including two liquid containing vessels and a duct connecting them, the form of said vessels being such that the ends of the liquid column are of larger cross sectional area than the intermediate connecting body, so that the natural period of oscillation of the liquid is substantially longer than the period of roll of the ship but the duct having sufficient diameter to permit substantially free flow of the liquid under changes of course and speed whereby ballistic deflection is caused.

9. In an apparatus of the class described, the combination with a gyroscope, means for mounting the gyroscope for oscillation about a plurality of axes and for rotation in a direction opposite that of an ordinary pendulous gyroscopic compass, and means for transferring liquid from one side to the other, by gravity, so constructed that the natural period of oscillation of the liquid is substantially different than the period of rolling of the ship.

In testimony whereof I have affixed my signature.

HARRY L. TANNER.